Patented Apr. 17, 1923.

1,452,315

UNITED STATES PATENT OFFICE.

JOSEPH B. SCHEUER, OF LANETT, ALABAMA.

PROCESS FOR BLEACHING BARYTES.

No Drawing.   Application filed October 5, 1922.   Serial No. 592,607.

*To all whom it may concern:*

Be it known that I, JOSEPH B. SCHEUER, a citizen of the United States, and a resident of Lanett, county of Chambers, and State of Alabama, have invented an Improvement in the Processes for Bleaching Barytes, of which the following is a specification.

This invention aims to provide an improved process for bleaching barytes and similar ores, and is particularly adapted for the treatment of such ores which contain appreciable quantities of incompletely oxidized mineral and other impurities. Other aims and advantages of the invention will appear hereinafter.

An illustrative example of the practical application of my invention is the treatment of barytes for removing metals, metallic oxides, and organic matter occuring therein as impurities, the process being herein referred to as "bleaching."

I have discovered that barytes, or the crude ore of barium sulphate, yields readily to bleaching treatment by certain acids, sulphuric acid for example, when the ore is pre-heated or roasted in a finely pulverized condition.

The crude ore may be prepared for treatment in various ways, but I prefer to cleanse or wash it with a strong hydraulic jet to remove the organic impurities and loose earth which invariably cling to the outer surface of the large lumps or pieces as they come from the mine, and then crush or break it into pieces of smaller size in the presence of a stream of water which washes away or removes the organic matter appearing in some of the pores or crevices of the lumps.

The small lumps or pieces, thus crushed, next are preferably subjected to a scrubbing or tumbling action in a rotary scrubber or tumbler in the presence of a constant stream of water, which wears away the surfaces and produces a fine sludge or sediment. The sludge or sediment from the tumbler may be run to a settler and then to a classifier where the particles of barium sulphate, due to their greater specific gravity, will settle out more rapidly than the impurities contained therein and thus enable the separation and reclamation of the cleansed ore articles from the sludge for subsequent treatment.

The ore, after being removed from the scrubber or tumbler is preferably pulverized to a very fine powder, in which condition it is readily susceptible to bleaching in accordance with this invention.

The pulverized ore, including the fine particles reclaimed in the classifier, is preferably heated in an open roasting or pre-heating pan in a thin layer so that it is exposed to intimate contact with the atmosphere, whereby, upon the application of a sufficient quantity of heat for the proper time interval (as hereinafter explained), some of the metallic and organic impurities will be oxidized completely. The proper temperature to be applied and its duration of application must be determined by the character (physical and chemical properties) of the particular ore being treated. For example, ores containing appreciable quantities (say 1 to 2 per cent) of ferrous oxide and (say 4 to 5 per cent) of other impurities such as aluminum, silica and organic matter, may advantageously be roasted or pre-heated to a temperature of approximately six hundred degrees Fahrenheit (600° F.), and for a sufficient time, ranging from one to four hours, to oxidize completely the ferrous oxide to ferric oxide, in accordance with the well known chemical equation $4FeO+2O=2Fe_2O_3$. The temperature may be varied over a wide range but I have found that roasting or pre-heating at approximately 600° produces a very satisfactory result. The proper duration of the heat application may be readily determined by the change in color of the powder to a reddish brown due to the characteristic red color of ferric oxide. Much of the organic matter which is still present in the powder, due to its occurrence in the cracks and crevices of the tumbled ore prior to pulverization, will be volatilized or driven off as gases during the application of heat.

After the ore has been roasted or pre-heated and while it is still hot, it is subjected to the action of a bleaching re-agent, for example sulphuric acid, which preferably may be added in sufficient quantity to bring it to a condition of a pasty mass and to dissolve all of the soluble mineral oxides and some of the other impurities. The ferric oxide ($Fe_2O_3$) is completely and readily dissolved in the acid, forming a ferric sulphate $Fe_2(SO_4)_3$ solution containing also the acid salts of some of the remaining impurities. After all of the reactions are complete, the pasty mass is washed by a fresh stream or supply of water to remove the soluble sulphates and other products resulting from the reactions in the process of bleaching. The washed powder is white, and after drying is ready for the market. It is used extensively in this condition in the manufacture of cheap pigments, rubber goods, and for many other purposes.

I have found, by repeated experiments, that this process is particularly applicable to bleaching the barytes which occurs in large quantities in certain localities in this country, such as Bartow County, Georgia, for example. The Georgia ore is known to have certain peculiar characteristics and many prior, but unsuccessful attempts, have been made to bleach it commercially. The Georgia ore contains approximately ninety three per cent (93%) of barium sulphate, and the remaining percentage consists chiefly of iron, aluminum, silica and organic matter. In some samples, traces of manganese, magnesium, calcium and titanium have been found. The iron content, occuring as ferrous oxide, ranges from one to two per cent and this, together with the organic matter, constitute the chief impurities to be removed. The ore is of a crystalline or granular formation, as distinguished from the amorphous ores generally found in other parts of the world, and is found in large lumps or pieces imbedded in clay and having cracks and crevices containing organic impurities. These lumps are somewhat similar to a piece of marble having cracks and seams running through it.

Due to the peculiar physical and chemical characteristics of the Georgia ore, the well known methods of removing impurities from amorphous or other ores cannot successfully be applied since the impurities in the hard marble like pieces are not readily attacked by the bleaching agents. The ore, when it is treated in accordance with my invention yields readily to bleaching because the objectionable impurities are exposed to the air or other oxidizing agent and may easily be removed.

While the treatment that I have described is only one specific application of the invention and is particularly applicable to Georgia ore, it will be understood that the invention is applicable to the treatment of other barytes and similar ores having some of the same characteristics.

Having thus described one illustrative application of my invention and without restricting myself thereto, what I claim and desire to secure by Letters Patent is:

1. In the process of purifying barytes, the steps which comprise reducing the ore to a fine powder, heating the powder in the presence of an oxidizing agent to oxidize some of the impurities therein, and removing the oxidized impurities.

2. In the process of purifying barytes containing appreciable quantities of incompletely oxidized impurities, the steps which comprise pulverizing the ore, subjecting the pulverized ore to an oxidizing roast to oxidize some of the mineral impurities therein and adding a mineral acid to dissolve the oxidized mineral impurities.

3. In the process of purifying crystalline barytes containing an appreciable quantity of iron as a natural impurity in the ferrous state, the steps which comprise pulverizing the ore, and subjecting the pulverized mass to an oxidizing roast to convert the iron from the ferrous to the ferric state, whereby to facilitate subsequent removal thereof.

4. In the process of purifying crystalline barytes containing metallic impurities, the steps which comprise grinding the ore to a relatively fine powder, oxidizing the impurities therein by roasting, converting a portion of the remaining oxides into soluble salts and treating the mass with water to remove the soluble salts.

5. The process of purifying barytes containing appreciable quantities of iron as a natural impurity, which comprises reducing it to a fine powder, roasting the powder in a relatively thin layer and in intimate contact with the air whereby to oxidize the iron completely and to remove organic impurities, treating the oxidized mass with a mineral acid to produce a soluble salt, and removing the soluble salt.

6. The method of bleaching crystalline barytes which comprises reducing it to a relatively fine powder, heating the powder to a temperature of approximatey 600 F., from one to four hours in intimate contact with air to oxidize and also remove some of the impurities therein, and converting the remaining mineral oxides into a soluble salt to facilitate removal.

In testimony whereof, I have signed my name to this specification.

JOSEPH B. SCHEUER.